(12) United States Patent
Matsumoto

(10) Patent No.: US 8,289,342 B2
(45) Date of Patent: Oct. 16, 2012

(54) IMAGE PROCESSING APPARATUS AND STORAGE MEDIUM HAVING STORED THEREIN AN IMAGE PROCESSING PROGRAM

(75) Inventor: Naoya Matsumoto, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 58 days.

(21) Appl. No.: 13/028,386

(22) Filed: Feb. 16, 2011

(65) Prior Publication Data

US 2011/0205236 A1 Aug. 25, 2011

(30) Foreign Application Priority Data

Feb. 22, 2010 (JP) ................................. 2010-036639

(51) Int. Cl.
*G09G 5/00* (2006.01)
*G09G 5/02* (2006.01)
*H04N 5/46* (2006.01)
*H04N 1/40* (2006.01)
*G06K 9/40* (2006.01)
*G06K 9/00* (2006.01)
*G03F 3/08* (2006.01)
*G06T 15/60* (2006.01)
*H04N 5/00* (2006.01)
*H04N 5/57* (2006.01)

(52) U.S. Cl. ........ 345/582; 345/426; 345/589; 345/619; 345/156; 348/557; 348/615; 348/687; 358/518; 358/447; 358/448; 358/523; 382/162; 382/254; 382/274; 382/266

(58) Field of Classification Search .......... 345/426–428, 345/581–583, 589–593, 600, 601–603, 606–611, 345/619, 630, 441–443, 156, 549, 207, 690; 358/515–518, 447–448, 453, 523; 348/557, 348/560, 615, 687; 382/162, 167, 202, 254
See application file for complete search history.

(56) References Cited

U.S. PATENT DOCUMENTS 5,307,452 A * 4/1994 Hahn et al. ..................... 345/592
5,432,896 A * 7/1995 Hwong et al. ................. 345/592

FOREIGN PATENT DOCUMENTS

JP 07-044867 A 2/1995
* cited by examiner

*Primary Examiner* — Wesner Sajous
(74) *Attorney, Agent, or Firm* — Holtz, Holtz, Goodman & Chick, P.C.

(57) ABSTRACT

A texture processing unit 54 carries out texture processing on data of a plurality of pixels selected by a processing object selection unit 53 using the same brush stroke pattern and respective colors of the pixels. A hatching processing unit 55 carries out hatching processing of adding diagonal expression substantially perpendicular to the orientation of the stroke pattern on data of an area of low luminance (i.e., dark) pixels from among the image data including YUV components using the respective colors of the pixels. The composition unit 56 carries out composition processing of compositing the image data outputted from the hatching processing unit 55 with the image data outputted from the texture processing unit 54.

5 Claims, 7 Drawing Sheets

IMAGE PROCESSING APPARATUS AND STORAGE MEDIUM HAVING STORED THEREIN AN IMAGE PROCESSING PROGRAM

This application is based upon and claims the benefit of priority from the prior Japanese Patent Application No. 2010-036639 filed on Feb. 22, 2010, and the entire contents of which are incorporated herein by reference.

BACKGROUND OF THE INVENTION

1. Field of the Invention

The present invention relates to an image processing apparatus and a storage medium having stored therein an image processing program, and more particularly to technology for image processing that can generate data of an image with enhanced, artistically creative effects by taking into account an original image as a whole, as image processing to acquire an image of high artistic quality from the original image.

2. Related Art

Recently, for the purpose of enhancing artistically creative effects of an image acquired by photographing or the like, image processing of applying enhanced artistic effects to data of an original image has been carried out.

In order to achieve the above described purpose, for example, Japanese Patent Application Publication No. 1996-044867 discloses a technique that acquires information of luminance, saturation, and hue in units of pixels of an original image, and uses this information to simulate brush strokes and colors of artistic paintings such as watercolor and oil paintings, when data of the original image is converted to realize artistic enhancement.

SUMMARY OF THE INVENTION

However, the simulation carried out by the technique disclosed in Japanese Patent Application Publication No. 1996-044867 simulates in units of pixels only, and therefore lacks an artistic effect, especially in terms of taking into account the image as a whole.

The present invention was conceived in view of above problem, and it is an object of the present invention to provide a technique of image processing of acquiring an image of high artistic quality from an original image, and further, by taking into account the original image as a whole, generating data of an image of higher artistic quality.

In order to attain the above object, in accordance with a first aspect of the invention, there is provided an image processing apparatus, comprising:

an input unit that inputs data of an image;

a conversion unit that converts the data of the image inputted by the input unit into data of a form having a color space including a luminance component;

a selection unit that selects data of a plurality of pixels for each component constituting the color space, from the data of the image converted by the conversion unit;

a texture processing unit that carries out texture processing on the data of the plurality of pixels selected by the selection unit using a brush stroke pattern and using respective colors of the pixels;

a hatching processing unit that carries out hatching processing of adding a diagonal expression substantially perpendicular to an orientation of the brush stroke pattern on an area of data having pixels of low luminance from the data of the image converted by the conversion unit, using the respective colors of the pixels;

a composition unit that carries out processing of compositing the data of the image, on which the texture processing has been carried out by the texture processing unit, with the data of the image, on which the hatching processing has been carried out by the hatching processing unit;

a contour enhancement processing unit that carries out contour enhancement processing of enhancing a contour portion of the data of the image composited by the composition unit based on the luminance component of the data of the image converted by the conversion unit; and a storing control unit that controls storing the data of the image on which the contour enhancement processing has been carried out by the contour enhancement processing unit.

In order to attain the above object, in accordance with a second aspect of the invention, there is provided a non-transitory computer readable storage medium having a program stored thereon which causes a computer to perform image processing on data of an inputted image to implement functions comprising:

a conversion function that converts the data of the inputted image into data of a form having a color space including a luminance component;

a selection function that selects data of a plurality of pixels for each component constituting the color space, from the data of the image converted by implementation of the conversion function;

a texture processing function that carries out texture processing on the data of the plurality of pixels selected by implementation of the selection function using a brush stroke pattern, and also, using respective colors of the pixels;

a hatching processing function that carries out hatching processing of adding a diagonal expression substantially perpendicular to an orientation of the brush stroke pattern on an area of data having pixels of low luminance from the data of the image converted by implementation of the conversion function, using the respective colors of the pixels;

a composition function that carries out processing of compositing the data of the image on which the texture processing has been carried out by implementation of the texture processing function, with the data of the image on which the hatching processing has been carried out by implementation of the hatching processing function;

a contour enhancement processing function that carries out contour enhancement processing of enhancing a contour of the data of the image composited by implementation of the composition function based on the luminance component of the data of the image converted by implementation of the conversion function; and a storing control function that controls storing the data of the image, on which the contour enhancement processing has been carried out by implementation of the contour enhancement processing function.

According to the present invention, it is possible to realize image processing that can generate data of an image with enhanced artistically creative effects by taking into account an original image as a whole, as image processing to acquire an image of high artistic quality from the original image.

BRIEF DESCRIPTION OF THE DRAWINGS

FIG. 8 is a diagram illustrating one example of a Sobel filter used to generate an edge extraction image in the process of step S11 of the pastel-like image generation processing of FIG. 3;

FIG. 9 is a diagram illustrating one example of a pastel-like image acquired as a result of the pastel-like image generation processing of FIG. 3;

DETAILED DESCRIPTION OF THE INVENTION

The following describes an embodiment of the present invention with reference to the drawings.

Figure 1:
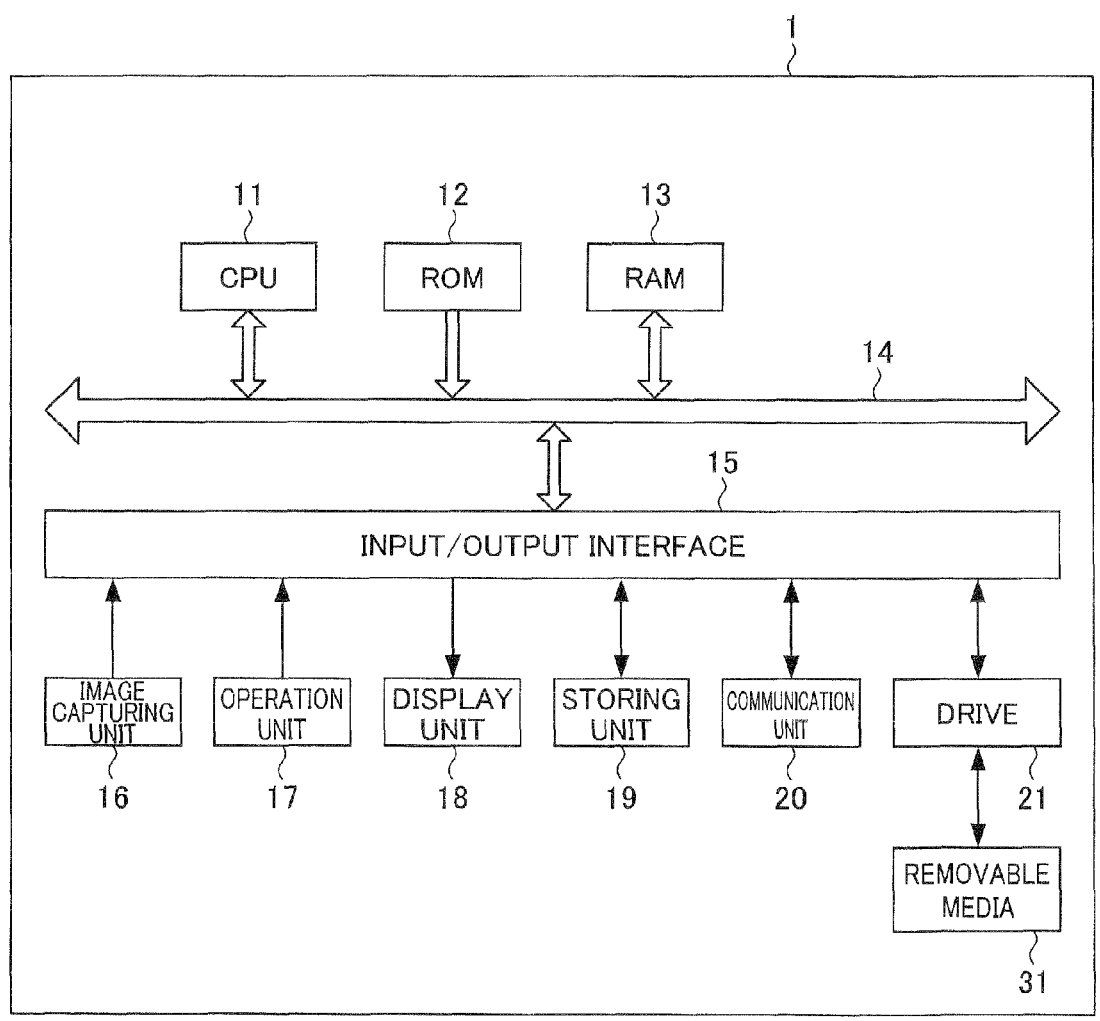
FIG. 1 is a block diagram showing a hardware configuration of an image capturing apparatus according to one embodiment of the present invention.

FIG. 1 is a block diagram showing a hardware configuration of an image capturing apparatus 1 as one embodiment of the image processing apparatus according to the present invention. The image capturing apparatus 1 can be configured by a digital camera, for example.

The image capturing apparatus 1 is provided with a CPU (Central Processing Unit) 11, a ROM (Read Only Memory) 12, a RAM (Random Access Memory) 13, a bus 14, an input/output interface 15, an image capturing unit 16, an operation unit 17, a display unit 18, a storing unit 19, a communication unit 20, and a drive 21.

The CPU 11 executes various processes according to programs that are stored in the ROM 12. Alternatively, the CPU 11 executes various processes according to programs that are loaded from the storing unit 19 to the RAM 13.

The RAM 13 also stores data and the like, necessary for the CPU 11 to execute the various processes, as appropriate.

For example, according to the present embodiment, programs for implementing functions of an image conversion unit 52, a processing object selection unit 53, a texture processing unit 54, a hatching processing unit 55, a composition unit 56, a contour enhancement processing unit 57, an edge extraction image generating unit 58, and a storing control unit 59 shown in FIG. 2, which will be described later, are stored in the ROM 12 or the storing unit 19. Therefore, each of the functions of the image conversion unit 52, the processing object selection unit 53, the texture processing unit 54, the hatching processing unit 55, the composition unit 56, the contour enhancement processing unit 57, the edge extraction image generating unit 58, and the storing control unit 59 can be realized by the CPU 11 executing processes according to these programs.

The CPU 11, the ROM 12, and the RAM 13 are connected to each other via the bus 14. The bus 14 is also connected with the input/output interface 15. The image capturing unit 16, the operation unit 17, the display unit 18, the storing unit 19, and the communication unit 20 are connected to the input/output interface 15.

The image capturing unit 16 is provided with an optical lens unit and an image sensor, which are not illustrated in the drawings.

The optical lens unit is configured by a light condensing lens such as a focus lens, a zoom lens, and the like, for example, to photograph a subject.

The focus lens is a lens for forming an image of a subject on the light receiving surface of the image sensor. The zoom lens is a lens for freely changing a focal point within a predetermined range.

The optical lens unit includes peripheral circuits to adjust parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type optoelectronic conversion device, or the like, for example. An image of a subject is made incident through the optical lens unit on the optoelectronic conversion device. The optoelectronic conversion device optoelectronically converts (i.e., captures) an image of a subject as an image signal at a predetermined interval, stores the image signal thus converted, and sequentially supplies the stored image signal to the AFE as an analog signal.

The AFE executes various kinds of signal processing such as A/D (Analog/Digital) conversion on the analog image signal. As a result of the various kinds of signal processing, a digital signal is generated and outputted as an output signal from the image capturing unit 16.

Hereinafter, the output signal from the image capturing unit 16 is referred to as "data of a captured image". Thus, data of a captured image is outputted from the image capturing unit 16 and provided as appropriate to the CPU 11 and the like.

The operation unit 17 is configured by various buttons and receives a user operation instruction. The display unit 18 displays various images. The storing unit 19 is configured by a DRAM (Dynamic Random Access Memory) and the like and temporarily stores data of captured images outputted from the image capturing unit 16. Also, the storing unit 19 stores various kinds of data necessary for various kinds of image processing, such as image data, values of various flags, threshold values, and the like. The communication unit 20 controls communication with other devices (not shown) via networks including the Internet.

The input/output interface 15 is connected with the drive 21 as necessary, and removable media 31 such as a magnetic disk, an optical disk, a magneto-optical disk, or a semiconductor memory is mounted to the drive as appropriate. Also, programs read from such media are installed in the storing unit 19. Furthermore, similar to the storing unit 19, the removable media 31 can store various kinds of data such as image data and the like, stored in the storing unit 19.

Figure 2:
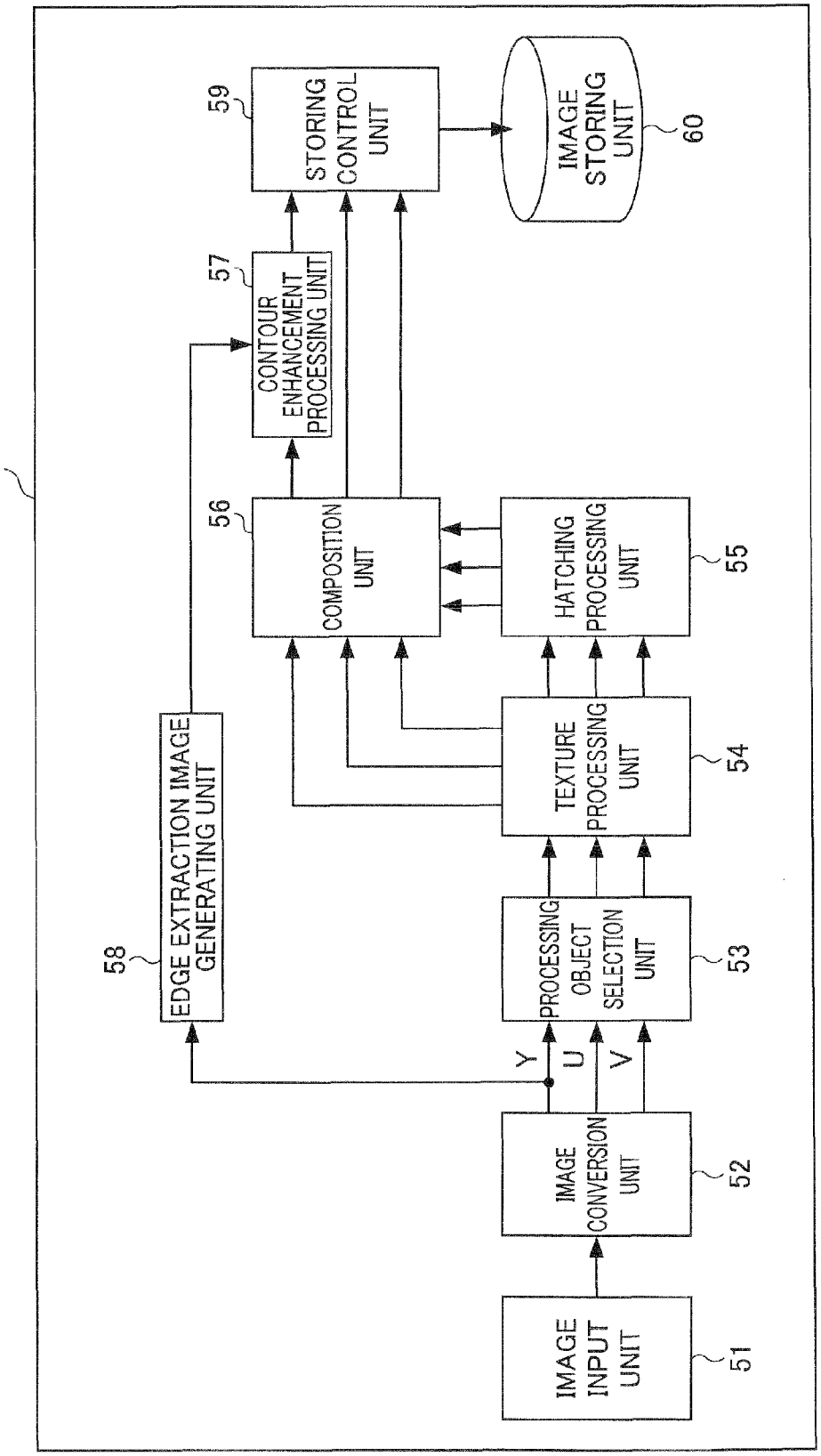
FIG. 2 is a functional block diagram showing a functional configuration of the image capturing apparatus shown in FIG. 1.

FIG. 2 is a functional block diagram showing a functional configuration of the image capturing apparatus 1 to carry out pastel-like image generation processing.

Here, the pastel-like image generation processing refers to processing of generating data of an image (hereinafter referred to as "pastel-like image") that resembles a painting drawn with a crayon, a pen, or the like, which is a kind of artwork having high artistic quality, from data of an initial image (hereinafter referred to as "original image") input as a target for image processing.

As shown in FIG. 2, the image capturing apparatus 1 includes an image input unit 51, an image conversion unit 52, a processing object selection unit 53, a texture processing unit 54, a hatching processing unit 55, a composition unit 56, a contour enhancement processing unit 57, an edge extraction image generating unit 58, a storing control unit 59, and an image storing unit 60 in order to implement the pastel-like image generation processing.

In the present embodiment, from among the constituent elements shown in FIG. 1, the image input unit 51 includes the image capturing unit 16, the communication unit 20, the drive 21, and the like, and inputs data of an original image.

This means that, in the present embodiment, the image input unit 51 inputs, as data of an original image, not only data of a captured image outputted from the image capturing unit 16 but also data of an image transmitted from another device and received by the communication unit 20, data of an image read by the drive 21 from the removable media 31, and the like.

In the present embodiment, each of the image conversion unit 52, the processing object selection unit 53, the texture processing unit 54, the hatching processing unit 55, the composition unit 56, the contour enhancement processing unit 57, the edge extraction image generating unit 58, and the storing control unit 59 is configured as a combination of the CPU 11 as hardware, and programs stored in the ROM 12 and the like as software, from among the constituent elements shown in FIG. 1.

Also, the image storing unit 60 is configured as an area in the RAM 13 or the storing unit 19 of the image capturing apparatus 1 or in the removable media 31, from among the constituent elements shown in FIG. 1.

The image conversion unit 52 carries out processing to convert the original image of the data inputted to the image input unit 51 from a form at the time of input, into data of a form of a color space having a luminance component. Such processing is hereinafter referred to as "image conversion processing".

As the destination color space of the image conversion processing of the present embodiment, what is referred to as a YUV space is employed as shown in FIG. 2. This means that, in the present embodiment, as a result of the image conversion processing by the image conversion unit 52, data including a luminance component (hereinafter referred to as "Y component"), a color difference component between luminance and blue components (hereinafter referred to as "U component"), and a color difference component between luminance and red components (hereinafter referred to as "V component") is acquired.

Hereinafter, data of the Y component, the U component, and the V component of an image is inclusively referred to as "YUV component(s)".

The processing object selection unit 53 selects a plurality of pixels as objects for texture processing, which will be described later, for each component of the color space, i. e., for each YUV component in the present embodiment, from data of the original image converted by the image conversion unit 52.

The texture processing unit 54 carries out texture processing on the plurality of pixels selected by the processing object selection unit 53 using the same brush stroke pattern, and also, using respective colors of the pixels.

Here, the texture processing is referred to as image processing that adds simulated texture of brush strokes of a crayon, a pen, or the like, onto an image. A pattern of such "simulated texture of brush strokes of a crayon, a pen, or the like" is referred to as "brush stroke pattern" in the present specification.

The form, size, and the like of a texture employed as a brush stroke pattern are not limited. In the present embodiment, however, a linear pattern shown in FIG. 6, which will be described later, is employed, and it is herein assumed that such a brush stroke pattern (always the same brush stroke pattern) is employed in the texture processing on data of each pixel, as described above.

Data of a pastel-like image is thus acquired by repeating such texture processing on data of each of the plurality of pixels selected for each of the YUV components.

Here, the "texture processing using colors of the pixels" described above includes not only processing of adding texture of the pixel color as it is, but also processing of adding texture of a color calculated based on the color information of the pixels.

As the texture color, in the present embodiment, a color is determined by a calculation based on the luminance of the texture and the color information (the value of the target component to be processed from among the YUV components) of the pixel at a position where the texture is added. More specifically, in the present embodiment, it is assumed that data of a pastel-like image as if drawn with a crayon, a pen, or the like on a sheet of white paper, can be acquired by reducing texture density and leaving blank space. Therefore, in order to soften a color gap between the blank space and the texture color, a color of slightly higher luminance than the original image is employed as the texture color.

Further details of the brush stroke pattern and the texture processing will be described later as processes of steps S3 to S8 of FIG. 3, with reference to FIGS. 4 to 7.

There may be a case where the pastel-like image of the data thus outputted from the texture processing unit 54 has still insufficient contrast between dark and bright areas.

Therefore, the hatching processing unit 55 carries out processing (hereinafter, referred to as "hatching processing") of adding diagonal expressed brush strokes substantially perpendicular to the orientation of the brush stroke pattern on an area of data having low luminance (i.e., dark) pixels from the image data including YUV components using the respective colors of the pixels.

Although the target to be processed by the hatching processing unit 55 is described in FIG. 2 to be the output data from the texture processing unit 54, the target is not limited to the example shown in FIG. 2 and can be the output data from the image conversion unit 52, for example.

The composition unit 56 carries out processing (hereinafter, referred to as "composition processing") of compositing the image data outputted from the hatching processing unit 55 and the image data outputted from the texture processing unit 54.

The image (hereinafter, referred to as "composite image") expressed by the data outputted from the composition unit 56 has diagonal brush strokes added to the texture and extending substantially perpendicular thereto in areas of low luminance. This enables the composite image to express clear contrast between dark and bright areas.

Further details of the hatching processing and the composition processing will be described later as processes of steps S9 and S10 of FIG. 3.

The contour enhancement processing unit 57 carries out image processing (hereinafter, referred to as "contour enhancement processing") of enhancing the edge (contour) portion of the composite image of the data outputted from the composition unit 56 based on the Y component outputted from the image conversion unit 52.

More specifically, the edge extraction image generating unit 58 generates data of an image having edge intensity as a pixel value thereof based on the Y component outputted from the image conversion unit 52. Such image data thus generated is, hereinafter, referred to as "data of an edge extraction image".

The contour enhancement processing unit 57, defines areas of pixels having values of high edge intensity as edge (contour) portions from the data of the edge extraction images thus generated by the edge extraction image generating unit 58, and carries out the contour enhancement processing on the edge portions of the composite image of the Y component outputted from the composition unit 56.

Further details of the contour enhancement processing including a method of generating the data of the edge extraction image will be described later as a process of step S11 of FIG. 3 with reference to FIG. 11 and the like.

The storing control unit 59 carries out control processing (hereinafter, referred to as "image storing processing") of storing, in the image storing unit 60, the image data on which the contour enhancement processing unit 57 has carried out the contour enhancement processing.

In the following, a description is given concerning the pastel-like image generation processing carried out by the image capturing apparatus 1 having such a functional configuration.

Figure 3:
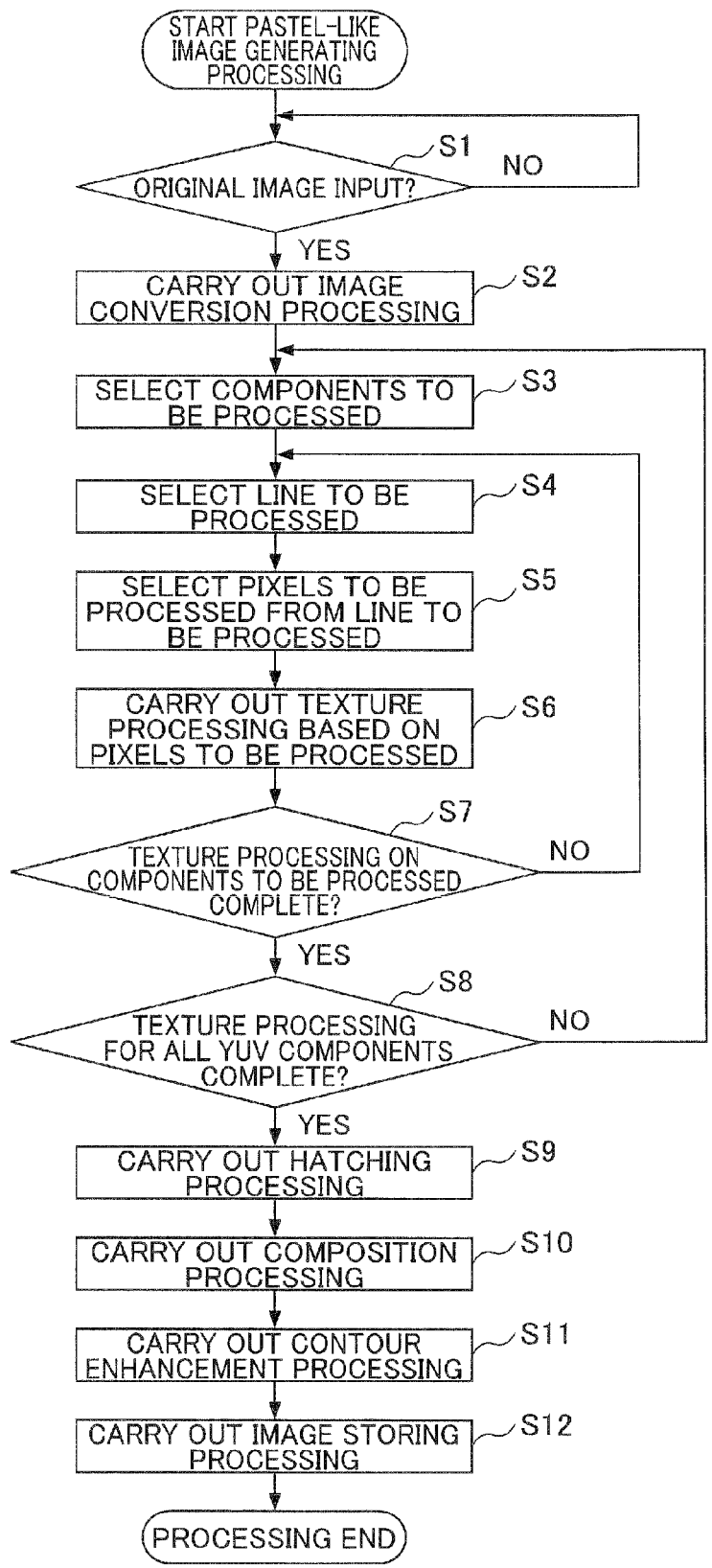
FIG. 3 is a flowchart showing one example of flow of pastel-like image generation processing carried out by the image capturing apparatus shown in FIG. 2.

FIG. 3 is a flowchart showing one example of flow of the pastel-like image generation processing.

In step S1, the image input unit 51 determines whether or not data of an original image is input. If data of an original image is not input, NO is determined in step S1, and the determining process of step S1 is executed again. This means that the pastel-like image generation processing enters into a waiting state by repeating the determining process of step S1 until data of an original image is inputted.

After that, when data of an original image is inputted to the image input unit 51, YES is determined in step S1, and control proceeds to step S2.

In step S2, the image conversion unit 52 carries out the image conversion processing on data of the original image inputted to the image input unit 51. As a result thereof, in the present embodiment, YUV components of the original image are acquired as described above and provided to the processing object selection unit 53.

In step S3, the processing object selection unit 53 selects components of one predetermined type as components to be processed from among the components of YUV types of the original image.

In step S4, the processing object selection unit 53 selects an arbitrary line as a line to be processed from among a plurality of lines constituting the image of the components to be processed, hereinafter referred to as "image components to be processed".

In step S5, the processing object selection unit 53 selects a plurality of pixels to be processed from the line to be processed.

More specifically, the processing object selection unit 53 includes a pixel selection unit (not shown) that selects an arbitrary line of pixels from among the image components to be processed, and the pixel selection unit carries out the process of step S4.

Next, as the process of step S5, the processing object selection unit 53 generates a random value, for example, and selects a plurality of pixels to be processed from the line of pixels selected by the pixel selection unit based on the random value thus generated.

When the selection result by the processing object selection unit 53 is informed to the texture processing unit 54, control proceeds to step S6. In step S6, the texture processing unit 54 carries out the texture processing described above based on the plurality of pixels selected to be processed.

In the following, the processes of steps S4 to S6 are specifically described with reference to FIGS. 4 to 7.

Figure 4:
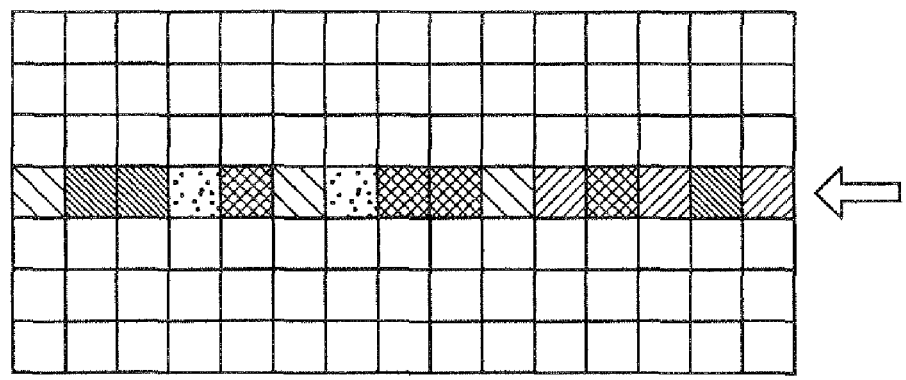
FIG. 4 is a diagram illustrating one example of a result of the process of step S4 of the pastel-like image generation processing of FIG. 3.
Figure 5:
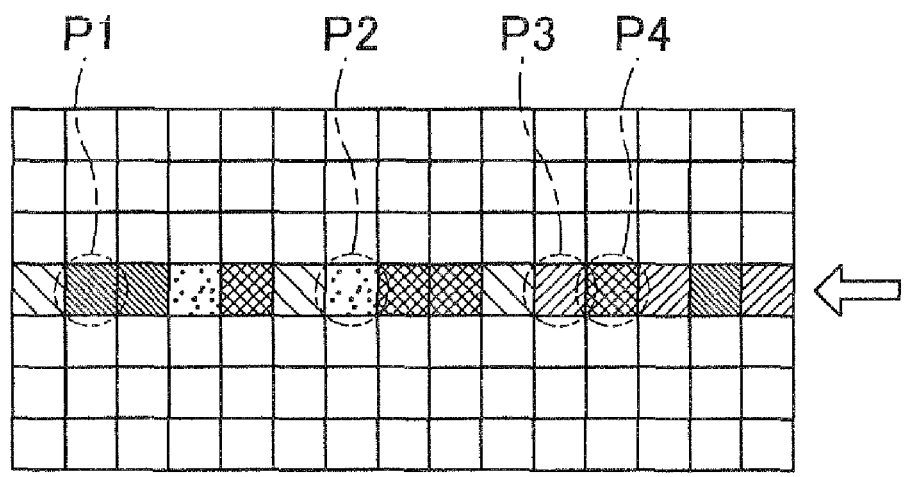
FIG. 5 is a diagram illustrating one example of a result of the process of step S5 of the pastel-like image generation processing of FIG. 3.
Figure 6:
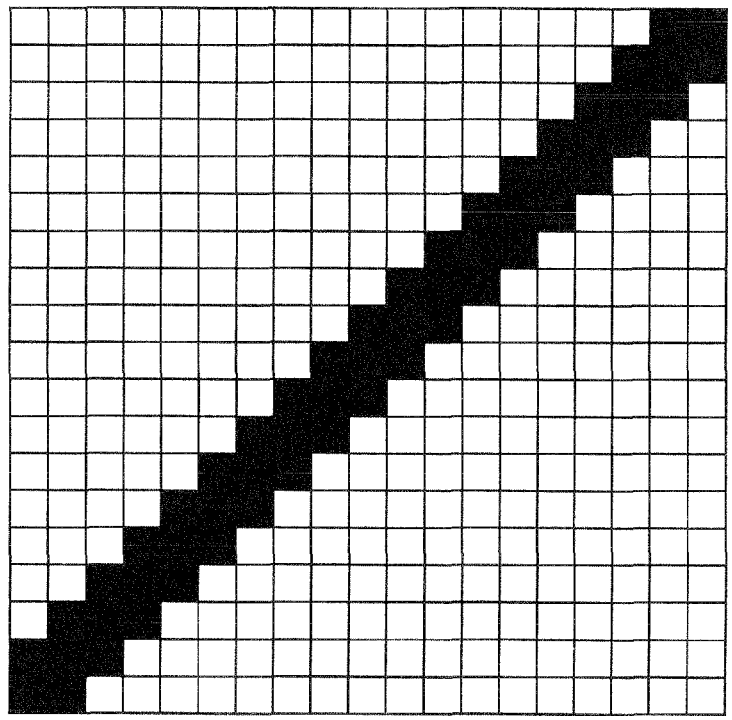
FIG. 6 is a diagram illustrating one example of a brush stroke pattern used in the process of step S6 of the pastel-like image generation processing of FIG. 3.
Figure 7:
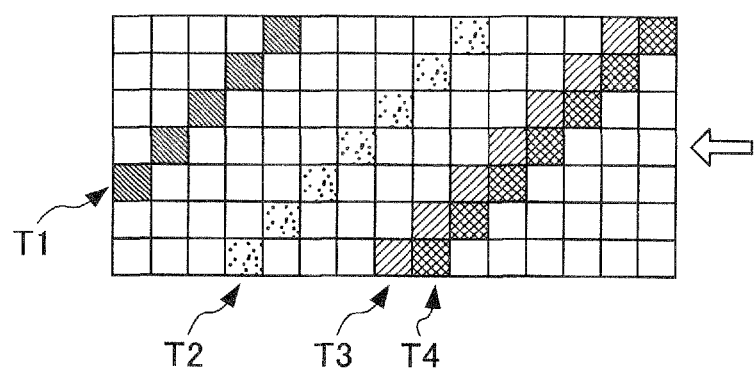
FIG. 7 is a diagram illustrating one example of a result of the process of step S6 of the pastel-like image generation processing of FIG. 3.

FIG. 4 is a diagram illustrating one example of a result of the process of step S4. FIG. 5 is a diagram illustrating one example of a result of the process of step S5. FIG. 6 is a diagram illustrating one example of a brush stroke pattern used in the process of step S6. FIG. 7 is a diagram illustrating one example of a result of the process of step S6.

FIGS. 4, 5, and 7 show the same partial area within the image of the components selected in the process of step S3. In FIGS. 4 to 7, one square denotes one pixel.

In the present example, as shown by the white arrow in FIG. 4, in the process of step S4, the fourth line from the top in the drawing area of FIG. 4 is selected as a line to be processed.

As shown in FIG. 5, in the process of step S5, four pixels P1 to P4 are selected to be processed from among the pixels constituting the line to be processed. As shown in FIG. 7, in the process of step S6, textures T1 to T4 are added at positions of the respective four pixels P1 to P4. The textures T1 to T4 are brush stroke patterns shown in FIG. 6 and have four respective colors calculated based on the corresponding pixel values (values of the components to be processed selected in the process of step S3) of the four pixels P1 to P4.

Back to FIG. 3, when the processes of steps S4 to S6 have been carried out on the line arbitrarily selected from among the components to be processed, control proceeds to step S7. In step S7, the texture processing unit 54 determines whether or not the texture processing on the components to be processed is completed.

The determining process carried out in step S7 is not limited to the present embodiment. As a determining process in step S7, the texture processing unit 54 may determine whether or not the processes of steps S4 to S6 have been carried out on all lines of the components to be processed, for example.

However, in the present embodiment, as described above, in order to generate data of a pastel-like image as if drawn on a sheet of white paper with a crayon, a pen, or the like, it is necessary to reduce the texture density so as to create blank space. On the other hand, if the processes of steps S4 to S6 are carried out on all lines of all of the components to be processed, the texture density may be excessively increased. In view of this, it will suffice to carry out the processes of steps S4 to S6 on a certain number of lines, in order to make the texture density appropriate.

Accordingly, as the determining condition in step S7 the present embodiment, it is assumed that the "certain number of lines" is defined as a threshold value in advance, and a condition is employed that the repeat count of the processes of steps S4 to S6 has exceeded the threshold value.

Therefore, if the repeat count of the processes of steps S4 to S6 for the components to be processed does not exceed the threshold value, NO is determined in step S7, control goes back to step S4, and the processes thereafter are repeated.

This means that, until the repeat count of the processes of steps S4 to S6 for the components to be processed exceeds the threshold value, a loop processing from steps S4 to S7: NO is repeated. At each repetition, an arbitrary line is selected as the line to be processed, from which a plurality of pixels are selected to be processed, and the texture processing is respectively carried out on the plurality of pixels.

After that, when the repeat count of the processes of steps S4 to S6 for the components to be processed exceeds the threshold value, YES is determined in step S7, and control proceeds to step S8.

In step S8, the texture processing unit 54 determines whether or not the texture processing of all the YUV components is completed. If there are components of any type left not selected to be processed from among the YUV components, NO is determined in step S8, control goes back to step S3, and the processes thereafter are repeated.

This means that, in the process of step S3, components of one type, left unselected for processing from among the components of YUV types, are selected to be processed subsequently, and the loop processing from steps S4 to S7: NO is repeated for the components of the type to be processed subsequently. At each repetition, an arbitrary line is selected as the line to be processed, from which a plurality of pixels are selected to be processed, and the texture processing is respectively carried out on the plurality of pixels.

When the processing described above has been carried out on all of the YUV components, YES is determined in step S8, and control proceeds to step S9.

As described above, in the present embodiment, a line to be processed is determined for each YUV component, a plurality of pixels to be processed is selected using respective random values, and the texture processing is carried out on each of the plurality of pixels.

As a result, in the data of the pastel-like image acquired at the time when YES is determined in step S8, there may be an area having only texture colored based on the U component and, conversely, there may be an area having no texture colored based on the U component. Similarly, there may be an area having only texture colored based on the V component and, conversely, there may be an area having no texture colored based on the V component.

In the eyes of a user, such a pastel-like image appears as if the texture is added, randomly changing the colors thereof.

However, the data of the pastel-like image acquired at the time when YES is determined in step S8 may lack clear contrast between dark and bright areas as described above.

Therefore, when YES is determined in step S8, in step S9, the hatching processing unit 55 carries out hatching processing of adding diagonal expressions of brush strokes substantially perpendicular to the orientation of the brush stroke pattern on an area of data having low luminance pixels from the image data including YUV components using the respective colors of the pixels.

In step S10, the composition unit 56 carries out composition processing of compositing the data of the image (the image having diagonal brush strokes substantially perpendicular to texture at pixel areas of low luminance) that is processed in the hatching processing of step S9 over the pastel-like image data acquired at the time when YES is determined in step S8.

Thus, the processes of steps S9 and S10 can be comprehended as processing of adding diagonal brush strokes substantially perpendicular to texture, to areas determined to be dark (having low luminance components) so that the contrast between dark and bright areas of the pastel-like image can be clearly expressed.

By carrying out such processes in steps S9 and S10, an effect similar to the effect of hatching, which is a painting technique, can be obtained.

More specifically, as the processes of steps S9 and S10, image processing of generating a layer of diagonal brush strokes and image processing of alpha blending are carried out on the data of areas having luminance not exceeding the threshold value.

Here, the color of a pixel at the same position in the original image, rather than black, is employed as the color of each pixel constituting the diagonal brush strokes. As a result thereof, an area having luminance not exceeding the threshold value becomes relatively darker than other areas having texture added thereon and can appear natural in the eyes of a user.

When the processes of steps S9 and S10 are thus executed and the composite image data described above is acquired, control proceeds to step S11.

In step S11, the contour enhancement processing unit 57 carries out contour enhancement processing on the composite image data based on the Y component of the original image, on which the image conversion processing has been carried out in step S2.

In the following, further detail of the contour enhancement processing will be described.

As described above, in the present embodiment, data of an edge extraction image is generated by the edge extraction image generating unit 58 in order to carry out the contour enhancement processing.

Although the method of generating the data of the edge extraction image is not limited, in the present embodiment, a method is employed that generates the data of the edge extraction image by way of a Sobel filter shown in FIG. 8.

In the following, further detail of the generating method of the data of the edge extraction image of the present embodiment will be described.

FIG. 8 is a diagram illustrating one example of a Sobel filter for 3 horizontal pixels by 3 vertical pixels. More specifically, FIG. 8A is a diagram illustrating one example of a Sobel filter for detecting a vertical component, and FIG. 8B is a diagram illustrating one example of a Sobel filter for detecting a horizontal component.

The edge extraction image generating unit 58 determines an attention pixel to be processed from among the pixels constituting the original image corresponding to the Y components outputted from the image conversion unit 52.

The edge extraction image generating unit 58 applies the Sobel filter for detecting a vertical component shown in FIG. 8A and the Sobel filter for detecting a horizontal component shown in FIG. 8B to the data (the Y component) of the attention pixel.

Here, a value acquired by applying the Sobel filter for detecting a vertical component shown in FIG. 8A to the data (the Y component) of the attention pixel is hereinafter referred to as "vertical Sobel value". The value of such a vertical Sobel value indicates the vertical edge intensity at the attention pixel. This means that the edge intensity at the attention pixel in a vertical direction increases in proportion to the vertical Sobel value.

Also, a value acquired by applying the Sobel filter for detecting a horizontal component shown in FIG. 8B to the data (the Y component) of the attention pixel is hereinafter referred to as "horizontal Sobel value". The value of such a horizontal Sobel value indicates the horizontal edge intensity at the attention pixel. This means that the edge intensity of the attention pixel in a horizontal direction increases in proportion to the horizontal Sobel value.

Making use of thus acquired vertical and horizontal Sobel values at the attention pixel, a pixel value of the edge extraction image at the attention pixel (a value indicating the edge intensity of the attention pixel) can be obtained as follows:

The edge extraction image generating unit 58 calculates the following equation (1) and thereby obtains the pixel value of the edge extraction image at the attention pixel.

The pixel value of the edge extraction image at the attention pixel=(|the vertical Sobel value|+|the horizontal Sobel value|)/2     (1)

In proportion to the pixel value acquired by the equation (1), the edge intensity is increased at the attention pixel, i.e., a likelihood that the attention pixel belongs to an edge portion is increased.

The edge extraction image generating unit 58 selects data of each pixel in the Y component of the original image as the attention pixel in turn, and repeats the processing described above, thereby generating the data of the edge extraction image.

The contour enhancement processing unit 57, defines areas having high pixel values (areas having high edge intensity) as edge (contour) portions from the data of the edge extraction images thus generated by the edge extraction image generating unit 58, and carries out the contour enhancement processing on the edge portions of the composite image of the Y component outputted from the composition unit 56.

As a result thereof, the process of step S11 of FIG. 3 ends, and control proceeds to step S12.

In step S12, the storing control unit 59 carries out image storing processing of storing in the image storing unit 60 the data of the pastel-like image, on which the contour enhancement processing has been carried out in step S11.

With this, the pastel-like image generation processing ends.

Figure 10:
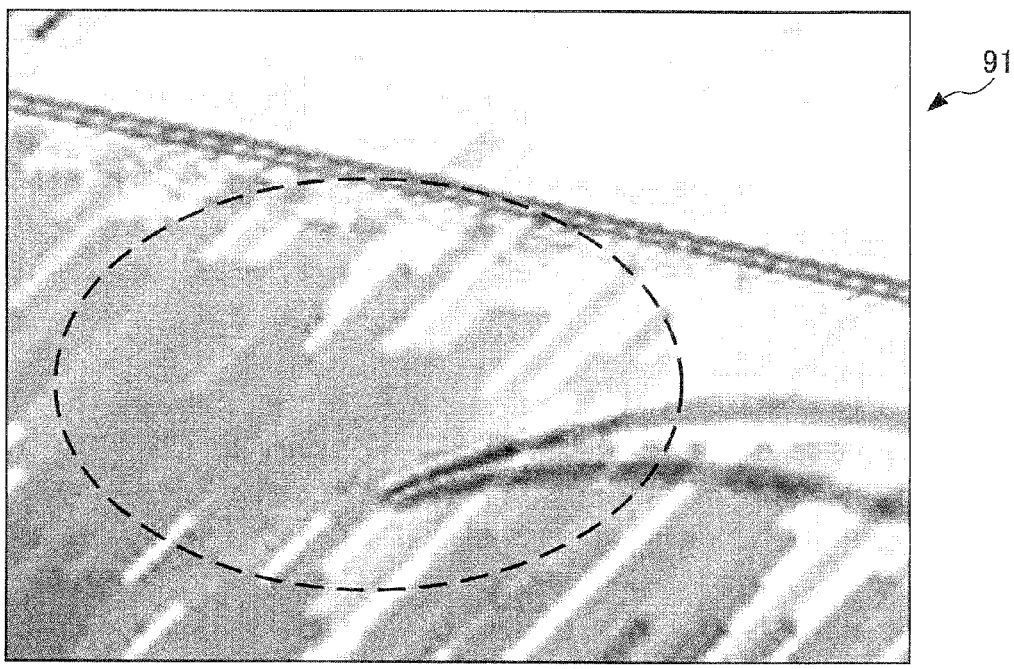
FIG. 10 is an enlarged view of a partial area of the pastel-like image of FIG. 9.

FIG. 9 is a diagram illustrating one example of a pastel-like image acquired as a result of the pastel-like image generation processing. FIG. 10 is an enlarged view of a partial area of the pastel-like image of FIG. 9. FIG. 11 is an enlarged view of a partial area of the pastel-like image of FIG. 9, which is different from the area of FIG. 10.

When the pastel-like image generation processing of FIG. 3 is carried out on data of an original image (not shown) including an automobile as a subject, data of the pastel-like image 81 shown in FIG. 9 is generated and stored in the image storing unit 60 of FIG. 2.

From the pastel-like image 81, an area of high luminance, e.g., the bright area 91 of the vehicle hood, which receives direct sunlight, is expressed by texture in the shape of diagonal brush strokes from upper right to lower left as is shown especially in the ellipsoidal area in the enlarged view of FIG. 10. It can be noticed that there are no diagonal brush strokes substantially perpendicular to the texture.

Figure 11:
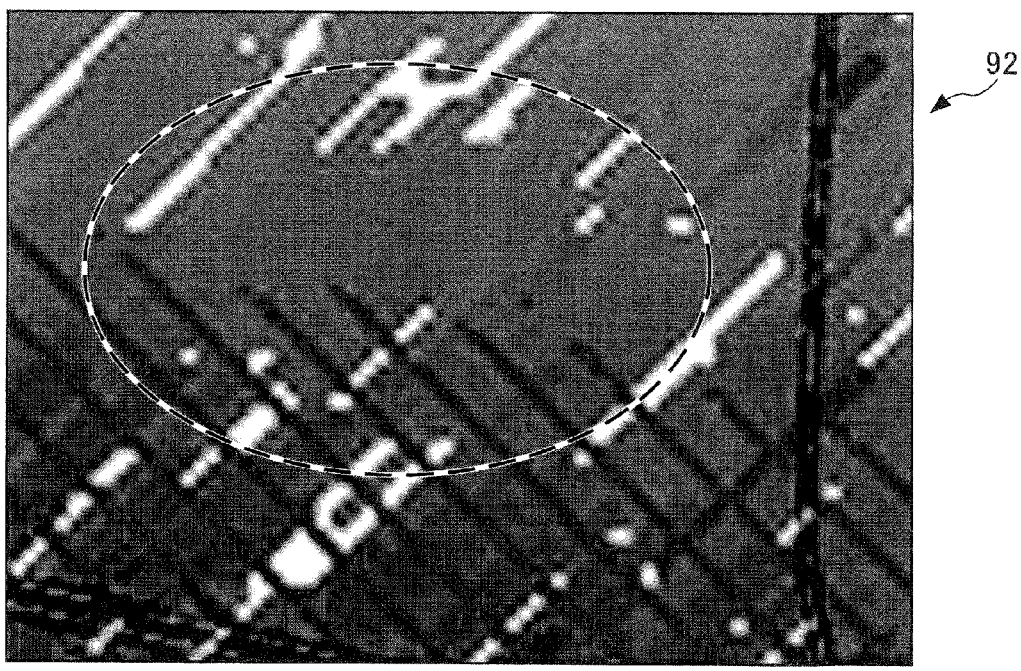
FIG. 11 is an enlarged view of a partial area of the pastel-like image of FIG. 9, which is different from the area of FIG. 10.

On the other hand, from the pastel-like image 81, an area of low luminance, e.g., the dark area 92 of the lower part of the vehicle door, which shows shadows, is expressed by, in addition to the texture in the shape of diagonal brush strokes from upper right to lower left, dark diagonal brush strokes from upper left to lower right, substantially perpendicular to the texture, as is shown especially in the ellipsoidal area in the enlarged view of FIG. 11.

Thus, by carrying out the pastel-like image generation processing of the present embodiment, it is possible to generate data such as the pastel-like image 81 with enhanced artistically creative effects giving consideration to light and dark of an original image as a whole.

It should be noted that the present invention is not limited to the embodiment described above, and modifications, and improvements thereto within a scope in which an object of the present invention can be realized are included in the present invention.

For example, in the embodiment described above, data of the same size as the original image is employed as a target of the processing object selection unit 53, the texture processing unit 54, the hatching processing unit 55, and the composition unit 56 of FIG. 2, but the present invention is not limited thereto.

More specifically, for example, there is a case in which it is difficult to process texture of large size due to the limited memory size of the RAM 13 and the like of the image capturing apparatus 1, and yet it is required to process texture of large size for the purpose of expressing a representation as if drawn with a crayon or a pen.

In such a case, reducing processing may be carried out on the YUV components outputted from the image conversion unit 52, and the data of the reduced size image thus acquired may be supplied to the processing object selection unit 53. In this case, it is necessary to enlarge the data outputted from the composition unit 56 into the size of the original image.

Furthermore, for example, in the embodiment described above, as a method of generating data of the edge extraction image by the edge extraction image generating unit 58, a method of applying Sobel filters to the Y component, which has been outputted from the image conversion unit 52, is employed for the purpose of enhancing the processing accuracy. However, the present invention is not limited to this.

More specifically, for example, a method can be employed that applies a LPF (Low Pass Filter) to the Y component outputted from the image conversion unit 52, and generates data of the edge extraction image by applying the Sobel filter to the data to which the LPF has been applied.

Furthermore, if an increase in speed is required, a method can be employed that generates data of the edge extraction image by applying any kind of filter such as a Laplacian filter, other than the Sobel filter, to the Y component outputted from the image conversion unit 52 or the data acquired by applying the LPF thereto.

Furthermore, a description has been given in the embodiment in which the image processing apparatus according to the present invention is configured by an image capturing apparatus such as digital camera. However, the present invention is not limited to an image capturing apparatus and can be applied to any electronic device that can carry out the image processing described above regardless of whether the device has or has not an image capturing function. More specifically, the present invention can be applied to a personal computer, a video camera, a portable navigation device, a portable game device, and the like.

The series of processes described above can be executed by hardware and also can be executed by software.

In a case in which the series of processes are to be executed by software, a program configuring the software is installed from a network or a storage medium into a computer or the like. The computer may be a computer embedded in dedicated hardware. Alternatively, the computer may be capable of executing various functions by installing various programs, i.e., a general-purpose personal computer, for example.

The storage medium containing the program can be constituted not only by the removable media 31 of FIG. 1 distributed separately from the device main body for supplying the program to a user, but also can be constituted by a storage medium or the like supplied to the user in a state incorporated in the device main body in advance. The removable media is composed of a magnetic disk (including a floppy disk), an optical disk, a magnetic optical disk, or the like, for example. The optical disk is composed of a CD-ROM (Compact Disk-Read Only Memory), a DVD (Digital Versatile Disk), or the like. The magnetic optical disk is composed of an MD (Mini-Disk) or the like. The storage medium, supplied to the user in a state in which it is incorporated in the device main body in advance, may include the ROM 12 of FIG. 1 in which the program is stored, a hard disk included in the storing unit 19 of FIG. 1, and the like, for example.

It should be noted that in the present specification the steps describing the program stored in the storage medium include not only the processing executed in a time series following this order, but also processing executed in parallel or individually, which is not necessarily executed in a time series.

What is claimed is:

1. An image processing apparatus, comprising:
   an input unit that inputs data of an image;
   a conversion unit that converts the data of the image inputted by the input unit into data of a form having a color space including a luminance component;
   a selection unit that selects data of a plurality of pixels for each component constituting the color space, from the data of the image converted by the conversion unit;
   a texture processing unit that carries out texture processing on the data of the plurality of pixels selected by the selection unit using a brush stroke pattern and using respective colors of the pixels;
   a hatching processing unit that carries out hatching processing of adding a diagonal expression substantially perpendicular to an orientation of the brush stroke pattern on an area of data having pixels of low luminance from the data of the image converted by the conversion unit, using the respective colors of the pixels;
   a composition unit that carries out processing of compositing the data of the image on which the texture processing has been carried out by the texture processing unit, with the data of the image on which the hatching processing has been carried out by the hatching processing unit;
   a contour enhancement processing unit that carries out contour enhancement processing of enhancing a contour portion of the data of the image composited by the composition unit based on the luminance component of the data of the image converted by the conversion unit; and
   a storing control unit that controls storing the data of the image on which the contour enhancement processing has been carried out by the contour enhancement processing unit.

2. An image processing apparatus as set forth in claim 1, wherein the selection unit includes a pixel selection unit that selects an arbitrary line in the image from the data of the image converted by the conversion unit, generates a random value, and selects the plurality of pixels from the line of pixels selected by the pixel selection unit based on the generated random value.

3. An image processing apparatus as set forth in claim 1, wherein the brush stroke pattern is a linear pattern.

4. An image processing apparatus as set forth in claim 1, wherein the input unit includes an image capturing apparatus.

5. A non-transitory computer readable storage medium having a program stored thereon which causes a computer to perform image processing on data of an inputted image to implement functions comprising:
   a conversion function that converts the data of the inputted image into data of a form having a color space including a luminance component;
   a selection function that selects data of a plurality of pixels for each component constituting the color space, from the data of the image converted by implementation of the conversion function;
   a texture processing function that carries out texture processing on the data of the plurality of pixels selected by implementation of the selection function using a brush stroke pattern and using respective colors of the pixels;
   a hatching processing function that carries out hatching processing of adding a diagonal expression substantially perpendicular to an orientation of the brush stroke pattern on an area of data having pixels of low luminance from the data of the image converted by implementation of the conversion function, using the respective colors of the pixels;
   a composition function that carries out processing of compositing the data of the image on which the texture processing has been carried out by implementation of the texture processing function, with the data of the image on which the hatching processing has been carried out by implementation of the hatching processing function;
   a contour enhancement processing function that carries out contour enhancement processing of enhancing a contour portion of the data of the image composited by implementation of the composition function based on the luminance component of the data of the image converted by implementation of the conversion function; and
   a storing control function that controls storing the data of the image on which the contour enhancement processing has been carried out by implementation of the contour enhancement processing function.

* * * * *